(12) United States Patent
Mueller

(10) Patent No.: US 8,489,289 B2
(45) Date of Patent: Jul. 16, 2013

(54) CONVERTER FOR SIGNALS BETWEEN A SAFETY DEVICE AND A SAFETY CONTROL DEVICE FOR A VEHICLE

(75) Inventor: Andreas Mueller, Lake Orion, MI (US)

(73) Assignee: Conti Temic Microelectronic GmbH, Nurnberg (DE)

( * ) Notice: Subject to any disclaimer, the term of this patent is extended or adjusted under 35 U.S.C. 154(b) by 0 days.

(21) Appl. No.: 12/195,503

(22) Filed: Aug. 21, 2008

(65) Prior Publication Data

US 2011/0196577 A1 Aug. 11, 2011

Related U.S. Application Data

(60) Provisional application No. 61/029,599, filed on Feb. 19, 2008.

(51) Int. Cl.
| | |
|---|---|
| *B60R 22/00* | (2006.01) |
| *E05F 15/00* | (2006.01) |
| *G05D 1/00* | (2006.01) |
| *G05D 3/00* | (2006.01) |
| *G06F 7/00* | (2006.01) |
| *G06F 17/00* | (2006.01) |

(52) U.S. Cl.
USPC ............... 701/46; 701/36; 701/45; 701/29.1; 701/29.2; 296/193.11; 296/35.2; 296/187.03; 267/140.11; 280/784; 180/232; 367/909

(58) Field of Classification Search
USPC ............... 701/1, 29, 34–36, 39, 45–49, 301; 701/29.1, 29.2, 31.7, 32.8, 33.7, 34.4; 340/901, 340/903, 904, 436; 455/95, 99; 367/909; 116/32; 296/193.11, 35.2, 187.01–30; 267/136–141.7; 280/781, 784; 180/232; 188/371–380, 266–322.5
See application file for complete search history.

(56) References Cited

U.S. PATENT DOCUMENTS

| | | | | |
|---|---|---|---|---|
| 5,415,429 A * | 5/1995 | Fisher | | 280/741 |
| 5,626,361 A * | 5/1997 | Heiner | | 280/756 |
| 6,302,458 B1 | 10/2001 | Wang et al. | | |
| 6,545,852 B1 * | 4/2003 | Arnold | | 361/160 |
| 7,504,783 B2 * | 3/2009 | Zarr | | 315/307 |
| 7,521,936 B2 * | 4/2009 | Stanley | | 324/522 |
| 7,602,328 B2 * | 10/2009 | Urie et al. | | 341/155 |
| 7,664,609 B2 * | 2/2010 | Adam et al. | | 702/47 |
| 2002/0014761 A1 * | 2/2002 | Miyasaka et al. | | 280/730.1 |
| 2007/0100519 A1 * | 5/2007 | Engel | | 701/33 |

FOREIGN PATENT DOCUMENTS

DE 102006043539 B3 8/2007

* cited by examiner

*Primary Examiner* — Thomas H. Tarcza
*Assistant Examiner* — Rami Khatib

(57) ABSTRACT

Disclosed is a converter (200) for signals between a safety device (300) and a universal safety control device (100) for a vehicle. At the converter (200) the safety control device (100) can be connected at a control device interface (200.1) and at least one type of safety devices (300.2) can be connected at at least one safety device interface (200.2) and wherein the converter (200) converts a signal of the safety control device (100) into a signal, which is suitable for the respectively connected type of safety device (300.2), to the respective safety device interface (200.2). It is proposed to embody the converter (200) such that it detects a condition at the safety device interface (200.2), in particular a diagnostics condition signal and converts it into a condition accordingly predefined at the control device interface (200.1), preferably in a manner which does not require an adaptation of the control device or of its software.

17 Claims, 5 Drawing Sheets

US 8,489,289 B2

CONVERTER FOR SIGNALS BETWEEN A SAFETY DEVICE AND A SAFETY CONTROL DEVICE FOR A VEHICLE

This application is a continuation-in-part of U.S. provisional application No. 61/029,599, filed Feb. 19, 2008.

BACKGROUND OF THE INVENTION

The present invention relates generally to a vehicle hood that is deployable upwardly in response to the vehicle impacting a pedestrian to provide additional crush space between the hood and underhood components.

For example, a vehicle engine hood is known, which in reaction to a collision of the vehicle with a pedestrian can be unfolded upwards, in order to provide additional crumple zone between the engine hood and the components below the hood.

In modern motor vehicle design it is desirable for reasons of visibility, aerodynamic and aesthetics that the hood line of the engine is as flat as possible. As a result, there is generally very little clearance between the hood and the engine bay contents of the automotive vehicle. Consequently, the hood is unable to yield enough to provide significant dampening if a pedestrian strikes the hood during an accident. Pedestrian safety performance can be improved by increasing the clearance between the hood and the vehicle components beneath the hood.

One way to achieve a greater clearance while maintaining a flat hood line during normal vehicle operations is to provide a device to raise the hood in response to or immediately prior to the vehicle impacting a pedestrian.

German patent DE 10 2006 043 539 B3 discloses a pedestrian protection system with pyrotechnical actuators shall be able to be fitted out with solenoid actuators. The disadvantage of this system is that the limited diagnostic capabilities. For example, the open line between additional module and actuator (output loop) cannot be diagnosed by the old ECU (input loop).

It would be desirable to provide a vehicle engine compartment hood that actively offers energy absorption when the vehicle is driven in a pedestrian rich environment or operating in conditions of high probability for pedestrian and vehicle collision.

It should be understood that the detailed description and specific examples, while indicating exemplary embodiments of the invention, are intended for purposes of illustration only and are not intended to limit the scope of the invention.

A vehicle engine compartment hood is provided for a vehicle body having a hood opening. A hood panel normally closes the engine compartment. A hood base panel underlies the hood panel and is pivotally mounted on the vehicle body for pivotal opening movement to lift the hood panel and allow access to the engine compartment through the hood opening. A mechanism acts between the hood panel and the hood base panel for selectively elevating the hood panel above the hood base panel and the hood opening when the vehicle is in a pedestrian rich environment. The mechanism absorbs energy when an impact is received against the hood panel.

SUMMARY OF THE INVENTION

An object of the invention is to permit diagnostics of the system and in doing so to recognize errors at the safety device or at the safety device interface. For this purpose the converter is embodied such that it converts a condition at the safety device interface, in particular a diagnostics condition signal into a condition at the control device interface, which is predefined for this condition at the safety device interface. Thus, the condition of the output loop is transferred by the converter into the input loop. In one form of embodiment an error in the output loop evokes the same error in the input loop and thus evokes its detection by the electronic control unit. The error in the input loop can be such that it copies the error in the output loop in such manner that the recognition method of the input circuit must not be adjusted to the interconnection of the converter so that neither the software and the hardware nor the configuration in the universal safety control device must be adapted to the converter.

This method prevents faults in the output loop from being unnoticed, thus mitigating the disadvantage of an additional module method according to patent DE 10 2006 043 539 B3.

BRIEF DESCRIPTION OF THE DRAWINGS

The present invention will become more fully understood from the detailed description and the accompanying drawings, wherein.

DETAILED DESCRIPTION OF THE DRAWINGS

The following description of exemplary embodiments is merely exemplary in nature and is in not intended to limit the invention, its application, or uses.

Figure 1:
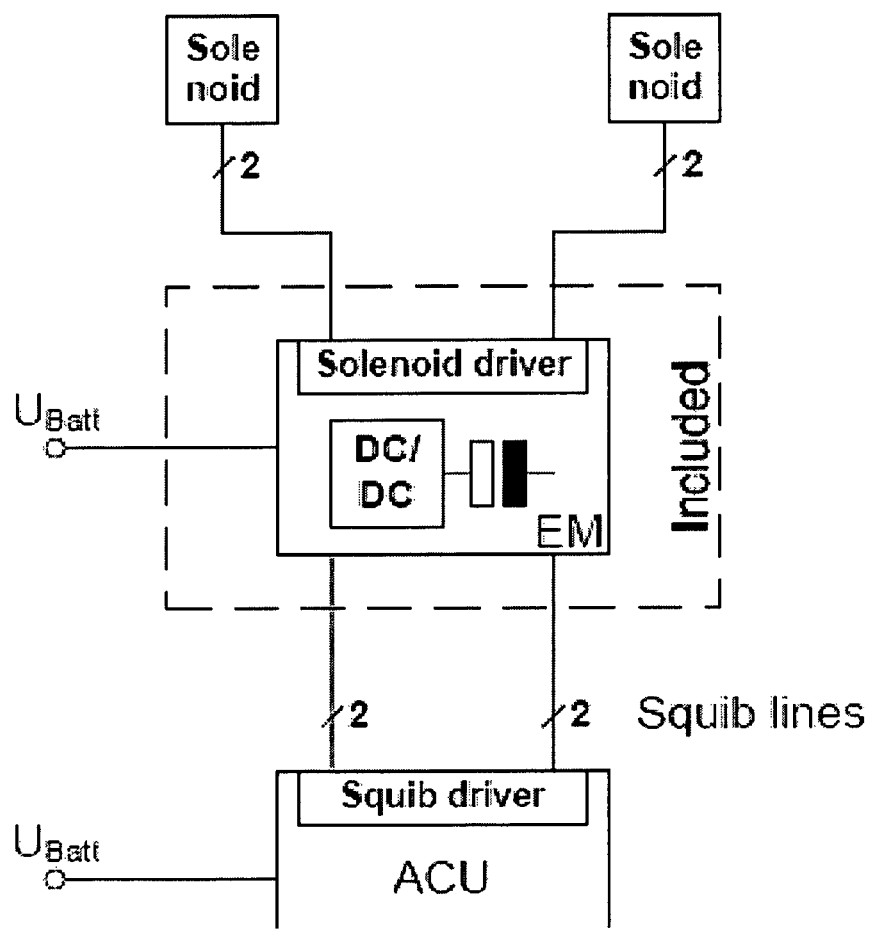
FIG. 1 shows a driver unit for a hood actuator.
Figure 2:
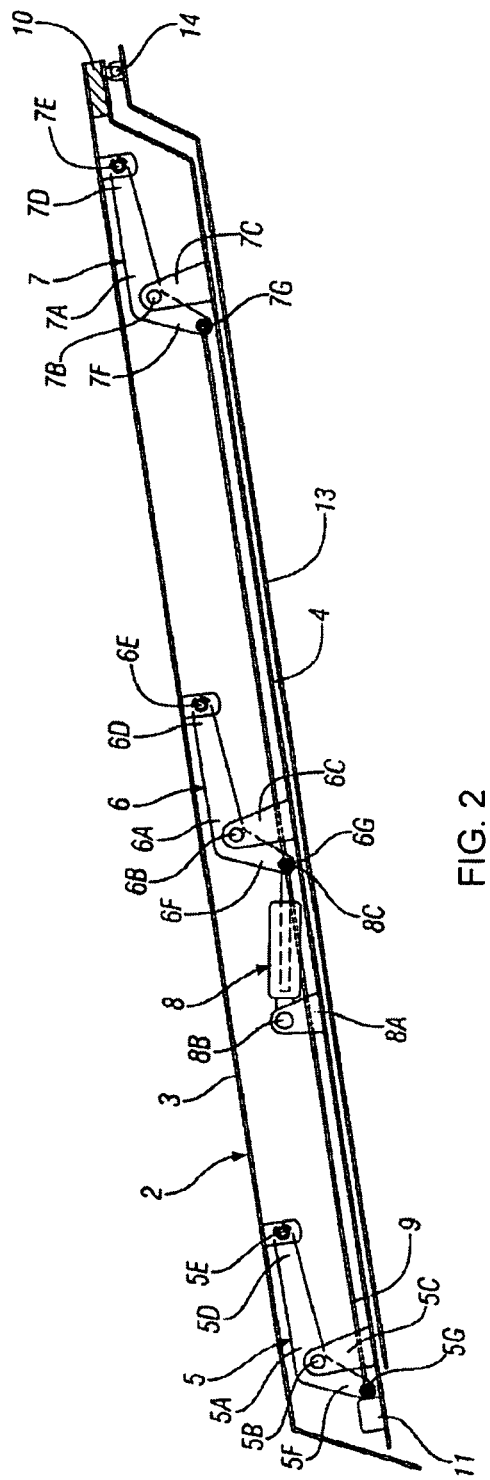
FIG. 2 shows a hood that can be raised from its closed position.

As seen in FIG. 2, the hood 2 includes a hood outer panel 3 and a hood inner reinforcement panel 15 that are attached together by a flange around their peripheral edges to form the one-piece hood 2. A hood base panel 16 underlies the outer panel 3 and the reinforcement 15 of the hood 2. A linkage mechanism, to be described hereinafter is provided between the hood 2 and the hood base panel 16.

Figure 3:
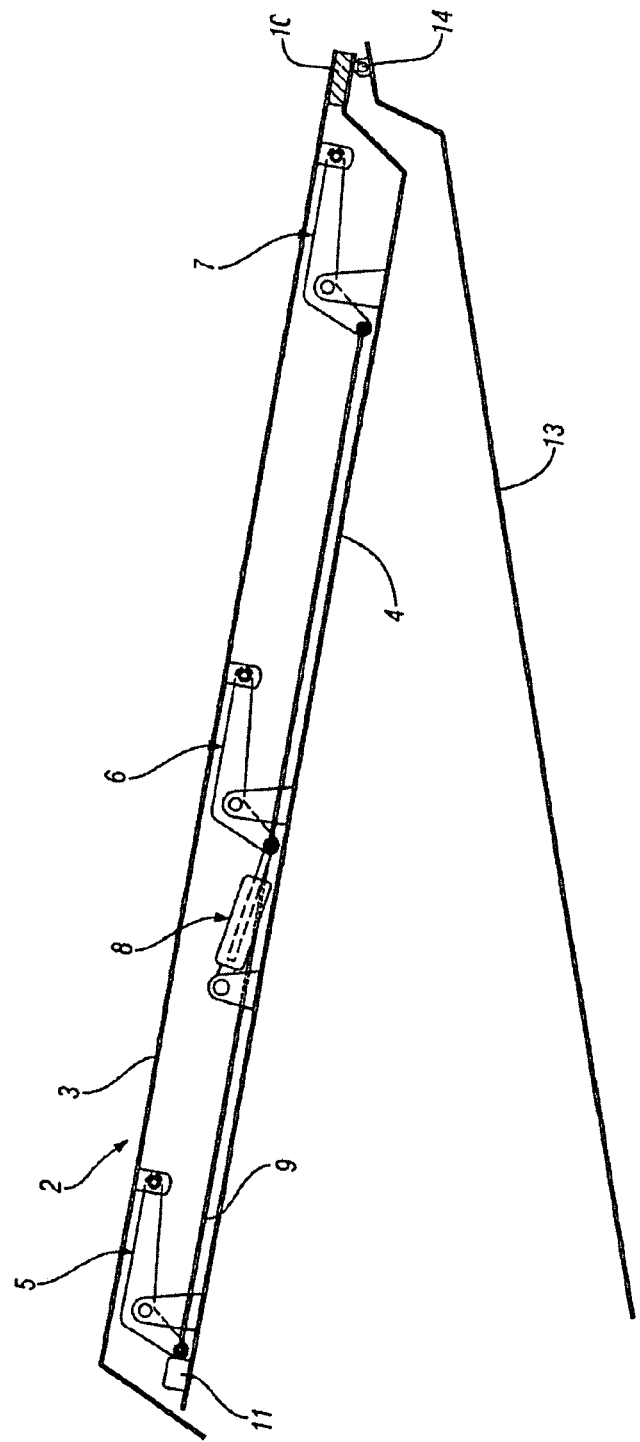
FIG. 3 is a view similar to FIG. 2 but showing the hood unlatched and pivoted open to permit access to the vehicle engine compartment.

As seen in FIGS. 2 and 3, hood hinges 14 are provided to pivotally mount the rear end corners of the hood base panel 16 on the fender flanges 13. A latch assembly 12, including a striker and a latch are provided at the front of the hood 2. The striker engages with the latch mounted on the header at the front of the hood opening to normally latch the hood 2 in a closed position. However, the striker can be unlatched from the latch to permit the hood 2 to be pivoted upwardly away from the fenders to the position of FIG. 3 for access to the engine compartment. The linkage mechanism acting between the hood 2 and the flanges 4 of the hood base panel 16 includes a front link 5, a middle link 6 and a rear link 7.

Front link 5 has a center portion 5A that is pivotally mounted by a pivot 5B to stanchion 5C that is attached to the flange 4 of the hood base panel 16. Link 5 also has an upper end 5D that is pivotally mounted to the hood 2 by a pivot 5E. And link 5 has a lower end 5F that is pivotally mounted to the connecting rod 9 by a pivot 5G.

Middle link 6 has a center portion 6A that is pivotally mounted by a pivot 6B to stanchion 6C that is attached to the flange 4 of the hood base panel 16. Link 6 also has an upper end 6D that is pivotally mounted to the hood 2 by a pivot 6E. And link 6 has a lower end 6F that is pivotally mounted to the connecting rod 9 by a pivot 6G.

Rear link 7 has a center portion 7A that is pivotally mounted by a pivot 7B to stanchion 7C that is attached to the flange 4 of the hood base panel 16. Link 7 also has an upper end 7D that is pivotally mounted to the hood 2 by a pivot 7E. And link 7 has a lower end 7F that is pivotally mounted to the connecting rod 9 by a pivot 7G.

Thus each of these links 5, 6 and 7 has a lower end that is pivotally connected to the connecting rod 9 so that the links are linked together and caused to pivot in unison about their respective pivot points. It will be appreciated that one of these linkage mechanisms is provided at each side of the hood 2.

An actuator 8 has one end pivotally connected to the flange 4 of the hood base panel by stanchion 8A and pivot 8B. Actuator 8 also has a second end that is pivotally connected to the lower end 6F of the middle link 6 and/or the connecting rod 9, by a pivot 8C. The actuator 8 and the linkage mechanism, including the links 5, 6, and 7 and the rod 9, cooperate to establish the hood 2 in a normal position in which the hood 2 fits flush within the hood opening 2A of the vehicle body.

Upon energization of the actuator 8, the actuator 8 and the links 5, 6, and 7 act as an elevator mechanism to elevate the hood 2. In particular, the actuator 8 is extended in length and pushes on the connecting rod 9 to cause the links 5, 6, and 7 to pivot from their retracted positions of FIGS. 2 and 4 to an elevated position shown in FIGS. 6 and 7 so that the hood 2 is elevated a few inches above the hood opening. When the actuator 8 is reversed, the actuator 8 will contract in length and pull the connecting rod 9 to cause the links 5, 6 and 7 to pivot down and return the hood 2 to the normal condition of FIG. 2. The normal position of the hood 2 is established by a cushion 10 mounted on the rear edge of the base panel 16. The rear end of the hood 2 comes to rest upon the cushion 10. In addition a stop 11 is provided at the front of the base panel 16 and the lower end 5F of the front link 5 and/or the connecting rod 9 comes to rest upon the stop 11.

One example of the actuator 8 is shown in U.S. Pat. No. 6,302,458. In this actuator, a tube is powered out to an extended position, or retracted to a retracted position by an electric motor. The actuator also includes a lock to lock the tube in the extended position, as well as an energy absorbing device that will allow forced retraction of the tube in the event that a certain level of force is exerted against the actuator in the retracting direction. The electric motor is connected with sensors and controllers and functions according to an algorithm that is designed for the particular application of the actuator.

The vehicle may be equipped with pedestrian sensors such as radar or vision sensor or infrared sensor or laser sensor, or a contact sensor. The vehicle also has conventional speed sensors and steering sensors and braking sensors and other sensors that gather information relating to the operation of the motor vehicle. A controller processes information from these sensors, as well as perhaps manual controls operated by the driver, and energizes the actuator 8 to elevate the hood 2 when the an algorithm determines that the vehicle is being driven in a pedestrian environment.

In operation, during normal highway operation of the vehicle, the hood outer panel 3 will be retracted to its normal position within the hood opening 2A. But when the controller determines that the vehicle has entered a pedestrian environment, the actuator 8 and the linkage mechanism will activate to elevate the hood outer panel 3 to the elevated position, whenever the hood outer panel 3 is elevated, the hood base panel 16 remains at its position of FIG. 2 that access to the engine compartment remains closed by the hood base panel 16.

When the vehicle leaves the pedestrian environment, the hood outer panel 3 is again lowered to its normal position of FIG. 2.

In the event that an impact is imposed upon the hood 2 while it is elevated, the hood outer panel 3 can collapse in a controlled manner via the energy absorbing retraction of the actuator 8. Or energy can be absorbed by flexure or deformation of the links 5, 6, and 7 and/or deformation of the hood 2. Thus the hood 2 yields to the imposed force and absorbs energy in a controlled manner.

In the event that the engine compartment needs to be accessed in order to service the engine, the latch 12B is released to release the striker 12A so that the hood 2 and the hood base panel 16 can be pivoted upwardly about the hinges 14, as seen in FIG. 3.

Figure 4:
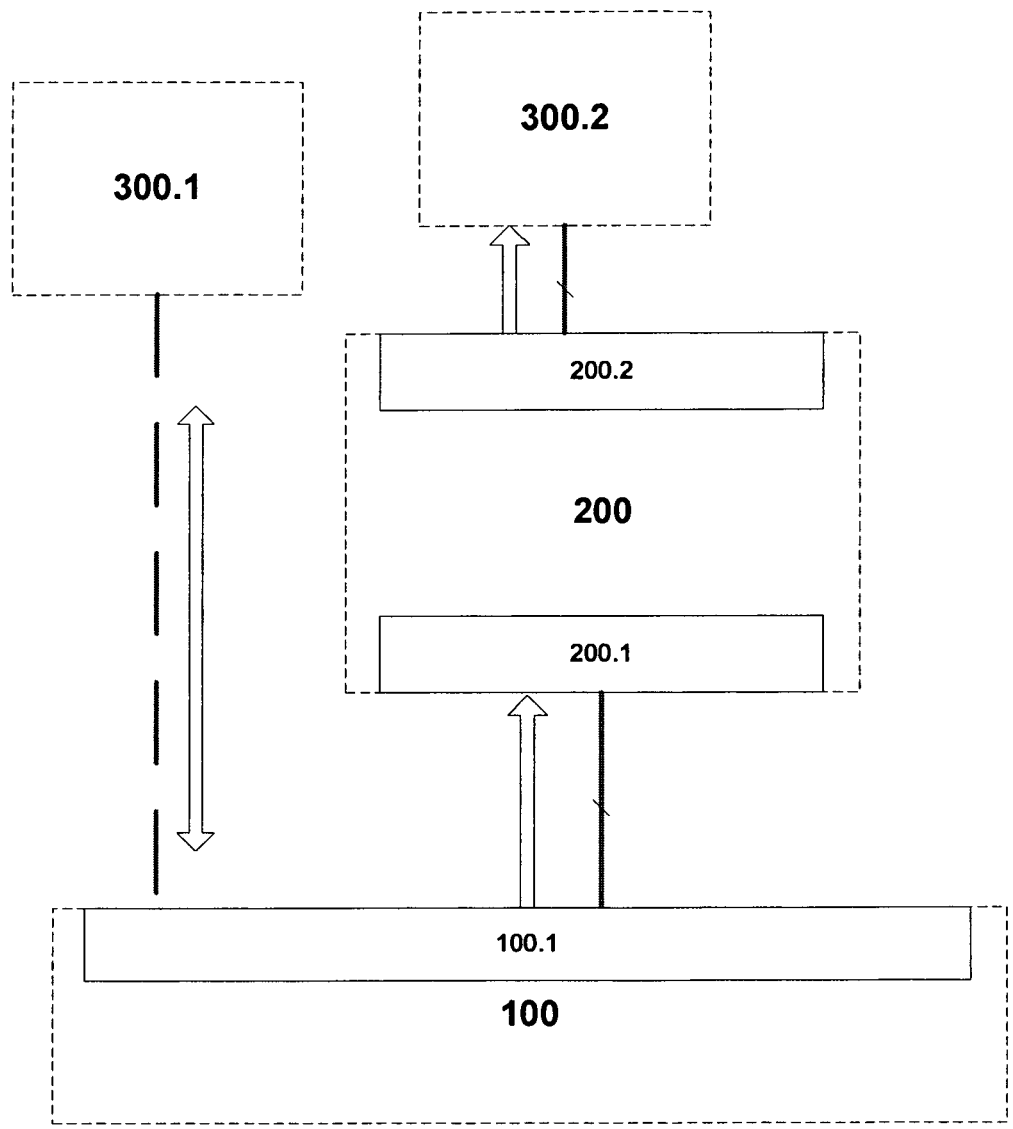
FIG. 4 shows a control unit for a hood actuator.

FIG. 4 outlines a universal safety control device 100 for a vehicle with a universal interface 100.1. Whereas certain types of safety devices 300.1 can be connected directly to the interface 100.1, for another type of safety devices 300.2 a converter 200 is provided to convert the signals of the safety control device 100 into a signal, which is suitable for the respectively connected type of safety device 300.2, to the respective safety device interface 200.2. Whereas the safety devices 300.1 directly connected at the control device 100 can be diagnosed by the control device 100, there is no need for this possibility with the safety devices 300.2 connected via the converter 200.

Such different types of safety devices are conceivable, however, not exclusively, even with pedestrian protection systems.

Figure 5:
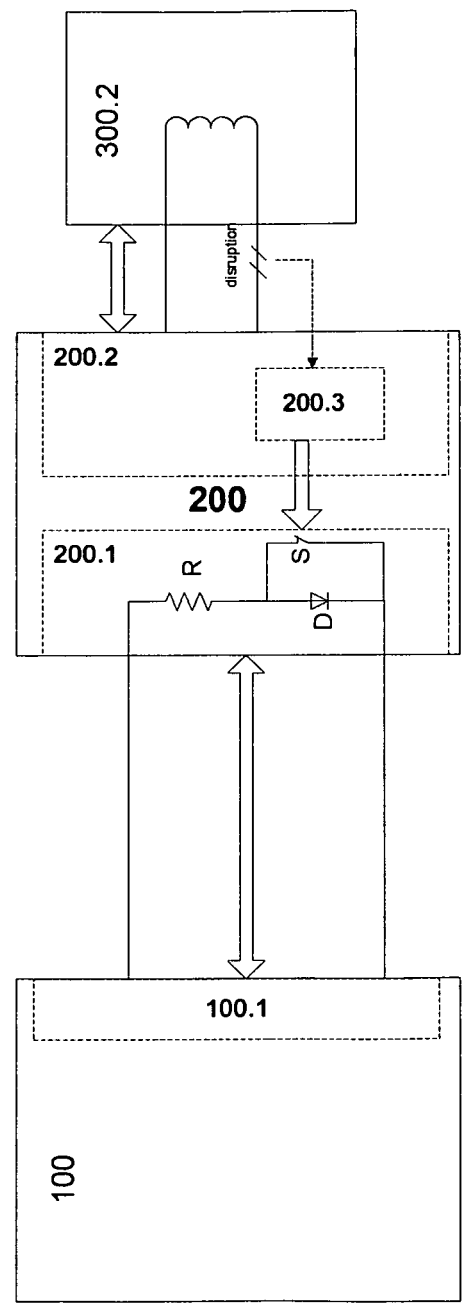
FIG. 5 shows a converter having improved diagnostics capabilities.

FIG. 5 shows an embodiment of the converter 200 according to the invention built into a vehicle between the safety device 300.2 and the universal safety control device 100. The safety control device 100 is connected at the control device interface 200.1 of the converter 200 and at least one safety device 300.2 of that type, which cannot be connected directly to the control device 100, is connected at the safety device interface 200.2. It goes without saying that a plurality of such safety devices 300.2 can be connected via one or respectively separate, own converters 200, in particular the converters 200 can be integrated into the safety devices 300.2.

The converter 200 converts a signal of the safety control device 100, for example an activation order into a signal, which is suitable for the respectively connected type of safety device 300.2, to the respective safety device interface 200.2.

Here, the converter 200 is embodied such that it detects a condition at the safety device interface 200.2, i.e. an electric condition such as a short circuit or an interruption, preferably, however, also a diagnostics condition signal and converts it into a condition predefined for this purpose at the control device interface 200.1.

The converter comprises a diagnostics unit 200.3 to diagnose at least preferably several predefined conditions at the safety device interface 200.2 as well as at least one switching means S for producing a predefined condition at the control device interface 200.1 If for example the diagnostics unit 200.3 recognizes a discrepancy of the electric resistance or voltage drop on the safety device interface from a predefined range, in particular a short circuit and/or an interruption, the converter 200 then produces by means of the switching means S a change of the electric resistance or voltage drop on the control device interface 200.1.

At least one predefined error at the safety device interface 200.2, for example a short circuit or an interruption, evoke the same error at the control device interface.

Therefore, if the converter detects an open circuit in the output loop, it opens, as is shown in FIG. 4, a switch in the input loop, so that the old electronic control unit detects an open circuit. This diagnostics is valid for both the input and the output loop—this must be taken into consideration in case of maintenance works. This switch can be any switching apparatus, such as e.g. a transistor, a field-effect transistor, a relay, etc.

When the interruption is detected in the output loop, the switch S (normally closed) is opened and the old electronic control unit also detects the interruption.

The diode D is mainly provided to enable an ignition also in that case in which an interruption is detected; its voltage drop with the diagnostics current is strong enough to be detected as an open circuit. The diagnostics current can be for example from 20 to 50 mA.

This means that the converter 200 realizes the change of the electric resistance or voltage drop on the control device interface 200.1 in such manner that the signal from the safety control device 100 is continued to be received.

In FIG. 4 R is the expected load resistance for the old electronic control unit (model 2 Ohm, the drain-source resistance or voltage drop of the switch is to be considered).

In similar form short circuits, discharge to ground or discharges to a battery can be diagnosed accordingly. Furthermore, the system can diagnose itself short circuits of the actuator or errors with the actuator parameters can be detected and transferred.

In this example the general ability to switch on the actuator 8 and to raise the hood is not influenced by the diagnostic method. The advantage shown in FIG. 4 is the ability to transfer the diagnostics from the input to the output loop.

A solution without programmable apparatuses (control units, FPGAs, etc.) is possible and essentially reduces expenditure and duration of the development by completely avoiding software processes.

It is provided that the aforementioned description of the invention is only exemplary and therefore any modifications thereof are within the scope of the invention. For example the actuator 8 can correspond to different mechanic, hydraulic or pneumatic types of construction. Or the connection mechanism can be replaced by hydraulic or pneumatic cylinders or by inflatable air bags or a pyrotechnic actuator. It will be understood that the foregoing description of the invention is merely exemplary in nature and, thus, variations thereof are intended to be within the scope of the invention. For example, the actuator 8 may be of various mechanical, hydraulic or pneumatic designs. Or the linkage mechanism can be replaced by hydraulic or pneumatic cylinder or by inflatable air bags or a pyrotechnic actuator. The actuator may be connected to any of the links, or to a connecting rod. The extent to which the hood 2 will be elevated is determined by the length of the links 5, 6, and 7. All of the links can be of the same length so that the front and rear will be elevated the same distance, as shown in the drawings. Or, for example, the front link 5 can be 2 inches, the middle link 6 can be 4 inches and the rear link 7 can be 6 inches, so that the hood 2 will be higher at the rear than at the front. Alternatively, the front link can be replaced by a simple front pivot so that the hood elevates by links at the rear of the hood for pivoting the hood about the front pivot.

I claim:

1. A device for transferring signals between a safety device (300) and a universal safety control device (100) for a vehicle, the device comprising:
a converter (200) and a safety control device (100), wherein the converter (200) and the safety control device (100) can be connected at a control device interface (200.1) and at least one safety device (300.2) can be connected at an at least one safety device interface (200.2) and wherein the converter (200) converts a signal of the safety control device (100) into a signal, which is suitable for the respectively connected safety device (300.2), to the respective safety device interface (200.2), wherein the converter (200) is embodied so that it detects a condition at the safety device interface (200.2), such as a diagnostics condition signal and converts it in a condition predefined at the control device interface (200.1);
wherein the safety control device (100) includes a universal interface (100.1), and wherein the universal interface (100.1) is a squib driver; and
wherein the at least one safety device interface (200.2) is a solenoid driver and the at least one safety device (300.2) is a solenoid actuator operable to move a vehicle hood between a normal position and an elevated position.

2. The device according to claim 1, wherein the converter comprises a diagnostics unit (200.3) to diagnose at least one condition at the safety device interface (200.2) as well as at least one switching means (S) for producing a predefined condition at the control device interface (200.1).

3. The device according to claim 2, wherein the diagnostics unit (200.3) recognizes a discrepancy of an electric resistance or voltage drop on the safety device interface from a predefined range, such as a short circuit or an interruption, and then produces by means of the switching means (S) a change of the electric resistance or voltage drop on the control device interface (200.1).

4. The device according to claim 3, wherein the change of the electric resistance or voltage drop on the control device interface (200.1) is effected in such manner that the signal from the safety control device (100) is continued to be received by the converter (200).

5. The device according to claim 2, wherein the at least one switching means (S) is one of a transistor, a field effect transistor, and a relay.

6. The device according to claim 1, wherein at least one predefined error at the safety device interface (200.2) evokes the same error at the control device interface.

7. A device for transferring signals in a vehicle comprising:
a safety control device (100);
a first safety device (300.1) connectable to the safety control device (100);
a converter (200) connected at a universal interface (100.1) of the safety control device (100), wherein the universal interface (100.1) is a squib driver;
a second safety device (300.2) connected at an at least one safety device interface (200.2) on the converter (200), wherein the second safety device (300.2) is a solenoid actuator operable to move a vehicle hood between a normal position and an elevated position;
wherein the converter (200) converts a signal from the safety control device (100) into a signal suitable for the second safety device (300.2); and
wherein the converter (200) detects a condition at the safety device interface (200.2), and converts the condition to a second predefined condition at the control device interface (200.1).

8. The device of claim 7, wherein the converter comprises a diagnostics unit (200.3) to diagnose the condition at the safety device interface (200.2) as well as at least one switching means (S) for producing the second predefined condition at a control device interface (200.1).

9. The device of claim 8, wherein the diagnostics unit (200.3) recognizes a discrepancy of an electric resistance or voltage drop on the safety device interface from a predefined range, and produces a change of the electric resistance or voltage drop on the control device interface (200.1) with the switching means (S).

10. The device of claim 9, wherein the change of the electric resistance or voltage drop on the control device interface (200.1) is effected in such manner that the signal from the safety control device (100) is continued to be received by the converter (200).

11. The device according to claim 9, wherein the at least one switching means (S) is one of a transistor, a field effect transistor, and a relay.

12. The device of claim 7, wherein at least one predefined error at the safety device interface (200.2) evokes the same error at a control device interface.

13. A device for transferring signals in a vehicle comprising:
- a safety control device (100);
- a pyrotechnical actuator (300.1) connectable to the safety control device (100);
- a converter (200) connected to the safety control device (100) at a control device interface (200.1), wherein the universal interface (100.1) is a squib driver;
- a solenoid actuator (300.2) connected at an at least one safety device interface (200.2) on the converter (200);
- wherein the converter (200) converts a signal from the safety control device (100) into a signal suitable for the solenoid actuator (300.2), wherein the solenoid actuator (300.2) is operable to move a vehicle hood between a normal position and an elevated position; and
- wherein the converter (200) detects a condition at the safety device interface (200.2), and converts the condition to a second predefined condition at the control device interface (200.1).

14. The device of claim 13, wherein the converter comprises a diagnostics unit (200.3) to diagnose at least one condition at the safety device interface (200.2) and at least one switching means (S) for producing the second predefined condition at the control device interface (200.1).

15. The device of claim 14, wherein the diagnostics unit (200.3) recognizes a discrepancy of an electric resistance or voltage drop on the safety device interface from a predefined range, and wherein the switching means (S) produces a change of the electric resistance or voltage drop on the control device interface (200.1).

16. The device of claim 15, wherein the change of the electric resistance or voltage drop on the control device interface (200.1) is effected in such manner that the signal from the safety control device (100) is continued to be received by the converter (200).

17. The device of claim 13, wherein at least one predefined error at the safety device interface (200.2) evokes the same error at the control device interface.

* * * * *